3,360,282
TRAILER TONGUE SUPPORT
Raymond O. Dugan, 1333 SW. 32nd St.,
Oklahoma City, Okla. 73119
Filed May 9, 1966, Ser. No. 548,579
5 Claims. (Cl. 280—475)

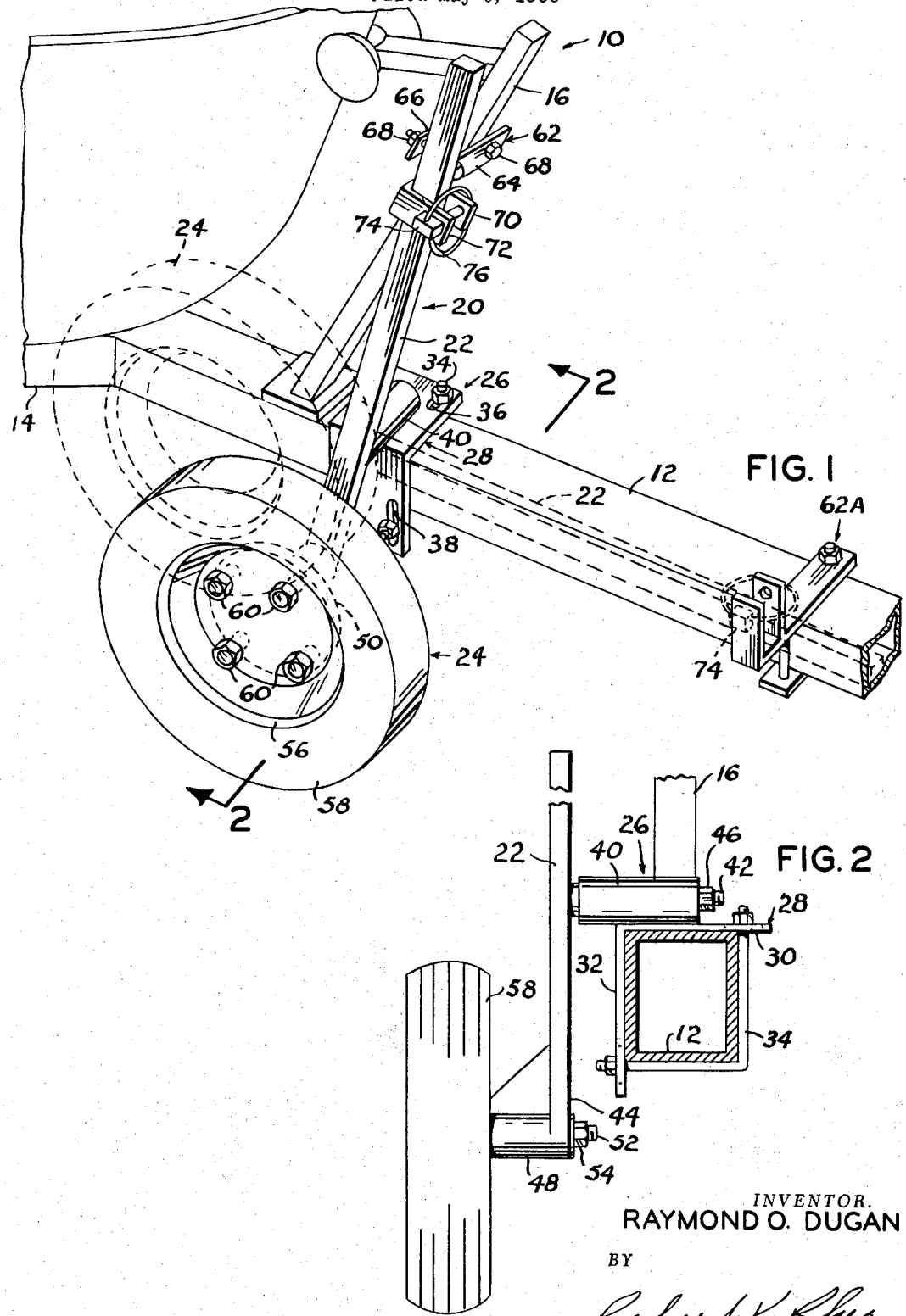

The present invention relates to two wheel trailer tongue supports and more particularly to a support assembly for a two wheel boat trailer.

The free end portion of most two wheel boat trailer tongues are solely supported by the towing vehicles. It is frequently desirable to disconnect the trailer from the towing vehicle which requires that the free end of the tongue be manually lifted out of contact with the towing attachment and manually lowered to the surface of the earth. Similarly when connecting the trailer tongue to a towing vehicle the tongue must be manually raised to effect the connection.

It is, therefore, the principal object of this invention to provide a support assembly for maintaining the trailer tongue of a two wheel trailer substantially horizontal with respect to the surface of the earth when the trailer is parked.

Another object is to provide a means for ease in manually raising and lowering the trailer tongue when connecting or disconnecting the trailer to a towing vehicle.

Another object is to provide a support assembly of this class which may be easily pivoted and held in an out of the way retracted position when not in use.

Still another object is to provide a support assembly including a wheel which may be used as a spare for the two wheeled trailer.

Still another object is to provide a support for a device of this class having adjustable bracket means attachable to substantially any type of two wheeled boat trailer presently in use.

The present invention accomplishes these and other objects by mounting an elongated lever at one side of a trailer tongue by bracket and bearing means wherein wheel means, connected to one end of the lever, may be pivoted into and out of earth engaging tongue supporting position by manually moving the other end of the lever. Latch means maintains the wheel in trailer tongue supporting and retracted position, respectively.

Other objects will be apparent from the following description when taken in conjunction with the accompanying single sheet of drawings, wherein:

FIGURE 1 is a fragmentary perspective view of the tongue portion of a two wheel boat trailer illustrating, by solid lines, the device in trailer tongue supported position and illustrating, by dotted lines, its retracted position; and, FIGURE 2 is an elevational view, partially in section, taken substantially along the line 2—2 of FIG. 1.

The reference numeral 10 indicates a two wheeled boat trailer, as a whole, having a trailer tongue 12 projecting forwardly of a boat supporting frame 14 and having a boat anchor support 16 connected at one end to the upper surface of the tongue 12 and projecting angularly upward toward the coupling end of the tongue, not shown.

The numeral 20 indicates the device, as a whole, comprising an elongated lever arm 22 pivotally connected, intermediate its ends, to one side of the trailer tongue and including a wheel assembly 24. The lever 22 may be of any cross-sectional configuration and of any desired length preferably great enough to provide the desired ease of fulcruming action as hereinafter described.

Bracket means 26 connects the lever to the trailer tongue 12. The bracket means comprises a right angular-shaped bracket 28 having an upper leg portion 30 overlying the upper surface of the trailer tongue 12 and a depending leg 32 contacting a side surface of the tongue. A pair of right angular shaped rods or bolts and nuts 34, only one of which is shown, respectively contact the lower surface and other side surface of the tongue 12 and project, at their end portions, through the respective legs 30 and 32 of the bracket 28, through suitable elongated slots 36 and 38 formed respectively in the bracket legs. The purpose of the slots 36 and 38 is to permit adjustment of the bracket 28 to surround and securely grip a plurality of cross-sectional shapes of trailer tongues. The upper bracket leg 30 has secured thereto a bearing housing 40 which projects laterally of the bracket in overhanging relation, at one end, with respect to the bracket leg 32. The axis of the bearing housing 40 is perpendicular to the longitudinal axis of the tongue 12. A laterally extending shaft or axle 42 is secured at one end to the lever 22 in spaced relation with respect to one end portion 44 of the lever. The shaft 42 extends through the bearing housing 40, from its overhanging end portion and is journaled thereby and held in place by a nut 46 thus forming a horizontal axis about which the lever 22 may be pivoted vertically.

The wheel assembly 24 comprises a wheel bearing housing 48 connected at one end to the lever end portion 44 and projects laterally therefrom opposite and parallel with respect to the bearing housing 40. A wheel flange 50, having an axle 52 coaxially connected thereto, is journaled by the wheel bearing housing 48 and held in place by a nut 54. A wheel 56, having a pneumatic tire 58 mounted thereon, is connected to the flange 50 by lug bolts 60 in turn connected to the flange 50. The wheel 56 and tire 58 are preferably of the size used by the two wheel trailer so that they may also be used as a spare wheel.

Latch means 62 is connected to the upper end portion of the anchor support 16. The latch means 62 comprises a pair of strap iron plates 64 and 66 disposed on opposing sides of the anchor support and clamped thereto by bolts and nuts 68. One end portion of the plate 64 is provided with laterally extending parallel legs 70 and 72 for receiving the free end portion of the lever 22 therebetween. A latch pin 74 extends through suitable apertures in the parallel legs 70 and 72 to releasably secure the lever 22. The latch pin 74 is provided with a split ring 76 having its respective ends nested in suitable sockets formed in off-set relation on opposing sides of the head portion of the pin 74. This places a tension or stress on the ring 76 when its plane is disposed perpendicular to the longitudinal axis of the pin to form a resilient spring-like action wherein the tension is reduced when the plane of the ring is disposed parallel with respect to the longitudinal axis of the pin. The diameter of the split ring 76 is such that it may be pivoted toward and surround the free end portions of the parallel legs 70 and 72 to lock the pin 74 against accidental removal. Similarly, a latch bracket 62A, identical with respect to the latch bracket 62, is connected to the trailer tongue 12 forwardly of the bracket means 26 with its parallel bars projecting upwardly for the purposes explained hereinbelow.

*Operation*

In operation the device 20 and latching brackets 62 and 62A are installed on the trailer tongue as described hereinabove.

When the device 20 is in transporting position, as shown by dotted lines (FIG. 1), the free end of the lever 22 is locked in place within the latching bracket 62A by the pin 74. This positions the wheel assembly 24 in an upward out of earth contacting position. When the trailer is to be uncoupled from the towing vehicle, not shown, the pin 74 is removed from the bracket 62A and the lever 22 is manually pivoted vertically toward and positioned between the parallel legs 70 and 72 which places the tire 58 in contact with the surface of the earth, not shown, and lifts the free end of the tongue 12 out of contact with the towing vehicle. The pin 74 is inserted to lock the lever 22 in elevated tongue supporting position. The lever 22 is released from trailer tongue supporting position by removing the pin 74, from the latching bracket 62, and manually lowering the free end of the lever so that the free end of the tongue is again coupled to the towing vehicle. The lever is thereafter secured to the latching bracket 62A.

Obviously, the invention is susceptible to some change or alteration without defeating its practicability, and I therefore do not wish to be confined to the preferred embodiment shown in the drawings and described herein, further than I am limited by the scope of the appended claims.

I claim:

1. A support assembly for a two wheel trailer tongue having an upstanding boat anchor intermediate its ends, comprising: an elongated lever; means connecting said lever, intermediate its ends, to said tongue forwardly of said boat anchor and in laterally off-set relation with respect to the longitudinal axis of said tongue permitting vertical pivoting movement of said lever about a horizontal axis; wheel means connected to one end portion and extending laterally of said lever opposite said tongue; and latch means connected with said boat anchor releaseably securing the other end portion of said lever.

2. Structure as specified in claim 1 in which the first said means comprises an adjustable angular bracket secured to said tongue, a bearing housing secured to said bracket, a laterally extending shaft secured at one end to said lever, and journaled at its other end portion by said bearing.

3. Structure as specified in claim 2 in which said wheel means comprises a wheel bearing connected with said lever, a plate coaxially connected with said wheel bearing, and a pneumatic tire equipped wheel connected with said plate.

4. Structure as specified in claim 3 in which said latch means comprises a pair of plates connected with said boat anchor, one of said plates projecting laterally of said boat anchor toward and intersecting the path of travel of said lever, the laterally projecting end portion of said one plate having a pair of alignedly apertured parallel legs for receiving a portion of the free end portion of said lever, and means removably locking said lever between said parallel legs.

5. Structure as specified in claim 4 in which the last mentioned means comprises, a pin having a head portion, the head portion of said pin having a socket formed in opposing side surfaces in off-set relation, and a split ring having its respective end portions nested by the respective sockets in said pin head.

References Cited

UNITED STATES PATENTS

| | | | |
|---|---|---|---|
| 2,205,436 | 6/1940 | Richards | 280—150.5 X |
| 2,788,227 | 4/1957 | Wallace | 280—475 |
| 2,920,906 | 1/1960 | Hinrichsen | 280—475 |
| 3,102,737 | 9/1963 | Williams et al. | 280—414 |
| 3,237,960 | 3/1966 | Ziegler et al. | 280—150.5 X |

LEO FRIAGLIA, *Primary Examiner.*